United States Patent
Yamamoto

(10) Patent No.: US 12,214,604 B2
(45) Date of Patent: Feb. 4, 2025

(54) IMAGE FORMATION DEVICE, CONTROL METHOD FOR IMAGE FORMATION DEVICE, AND CARTRIDGE

(71) Applicant: BROTHER KOGYO KABUSHIKI KAISHA, Nagoya (JP)

(72) Inventor: Shunsuke Yamamoto, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 87 days.

(21) Appl. No.: 17/935,658

(22) Filed: Sep. 27, 2022

(65) Prior Publication Data

US 2023/0018544 A1    Jan. 19, 2023

Related U.S. Application Data

(63) Continuation of application No. PCT/JP2021/012210, filed on Mar. 24, 2021.

(30) Foreign Application Priority Data

Mar. 31, 2020 (JP) ................................. 2020-063614

(51) Int. Cl.
*B41J 29/38* (2006.01)
*G03G 15/00* (2006.01)

(52) U.S. Cl.
CPC .............. *B41J 29/38* (2013.01); *G03G 15/50* (2013.01)

(58) Field of Classification Search
CPC ....... B41J 29/38; B41J 2/17546; G03G 15/50; G03G 21/1839; G03G 21/1875; G03G 15/0863; H04N 1/00

(Continued)

(56) References Cited

U.S. PATENT DOCUMENTS

2002/0012541 A1*  1/2002  Takemoto .......... G03G 15/5079
                                                   399/12
2002/0159777 A1* 10/2002  Nagata ................ B41J 2/17566
                                                   399/24

(Continued)

FOREIGN PATENT DOCUMENTS

CN       101907840 A      12/2010
CN       104427156 A       3/2015

(Continued)

OTHER PUBLICATIONS

International Preliminary Report on Patentability and Written Opinion issued issued in related international application PCT/JP2021/012210, Sep. 29, 2022.

(Continued)

*Primary Examiner* — Jason S Uhlenhake
*Assistant Examiner* — Alexander D Shenderov
(74) *Attorney, Agent, or Firm* — Merchant & Gould P.C.

(57) ABSTRACT

An image forming apparatus has a main body housing, a network interface for connecting to a network, a cartridge mountable to the main body housing and having a material or a component to be used for image formation in the image forming apparatus and a memory that stores contract information for permitting use of the cartridge in the image forming apparatus set to a contract mode, a communication unit for performing communication with using a mobile network different from the network, and a controller. The controller acquires the contract information from the memory, in a state where the cartridge is mounted to the main body housing, permits printing in the image forming apparatus using the cartridge based on the contract information, and transmits information about the image forming apparatus or the cartridge regarding the contract mode to a communication apparatus via the communication unit.

11 Claims, 10 Drawing Sheets

(58) Field of Classification Search
USPC .............................................................. 347/3
See application file for complete search history.

(56) References Cited

U.S. PATENT DOCUMENTS

| | | | |
|---|---|---|---|
| 2009/0112738 A1* | 4/2009 | Nagata | G06Q 30/0283 |
| | | | 705/28 |
| 2011/0229157 A1* | 9/2011 | Kawai | G03G 15/556 |
| | | | 399/27 |
| 2016/0292550 A1 | 10/2016 | Kawai | |
| 2017/0090830 A1 | 3/2017 | Tomono | |
| 2018/0131831 A1* | 5/2018 | Tolia | G06F 3/1229 |
| 2019/0251407 A1 | 8/2019 | Watanabe | |
| 2020/0079097 A1 | 3/2020 | Otsuka et al. | |
| 2020/0225885 A1* | 7/2020 | Akimoto | G06Q 30/06 |
| 2021/0252869 A1* | 8/2021 | Kishimoto | G06Q 10/087 |

FOREIGN PATENT DOCUMENTS

| | | |
|---|---|---|
| CN | 107735763 A | 2/2018 |
| JP | 2004-240756 A | 8/2004 |
| JP | 2004-265214 A | 9/2004 |
| JP | 2006-157401 A | 6/2006 |
| JP | 2008-164892 A | 7/2008 |
| JP | 2013-101437 A | 5/2013 |
| JP | 2014-216817 A | 11/2014 |
| JP | 2016-193592 A | 11/2016 |
| JP | 2017-175548 A | 9/2017 |
| JP | 2018-190155 A | 11/2018 |
| JP | 2020-42525 A | 3/2020 |
| WO | 2017/002309 A1 | 1/2017 |

OTHER PUBLICATIONS

Office Action issued in corresponding Chinese Patent Application No. 202180026989.1, Jan. 10, 2024.
International Search Report issued in corresponding International Patent Application No. PCT/JP2021/012210, dated Jun. 29, 2021.
Office Action issued in the corresponding Chinese Patent Application No. 202180026989.1, May 17, 2024.
Office Action issued in the corresponding Chinese Application No. 202180026989.1, Sep. 26, 2024.

* cited by examiner

IMAGE FORMATION DEVICE, CONTROL METHOD FOR IMAGE FORMATION DEVICE, AND CARTRIDGE

REFERENCE TO RELATED APPLICATIONS

This is a continuation application of International Application No. PCT/JP2021/012210 filed on Mar. 24, 2021 which claims priority from Japanese Patent Application No. 2020-063614 filed on Mar. 31, 2020. The entire contents of the earlier applications are incorporated herein by reference.

BACKGROUND ART

An image forming apparatus uses a consumable or a replacement component for performing image formation. The consumable is, for example, a cartridge accommodating toner or ink used by the image forming apparatus at the time of image formation. In addition, the replacement component is a cartridge that needs to be replaced depending on the use of the image forming apparatus.

The cartridge has a memory, and therefore stores a remaining amount of the consumable and a life-span of the replacement component in the memory. A controller of the image forming apparatus updates the remaining amount or the life-span stored in the memory, according to the use of the cartridge at the time of image formation. Further, by writing information about image forming apparatuses to the memory of the cartridge, it is also possible to specify an image forming apparatus that can use the cartridge, based on the written information. It is suggested to use a flat-rate service (subscription scheme) in a printer, which is a kind of the image forming apparatus, by using these functions.

In general, following steps are taken in order to use the subscription scheme for the printer Step (1) A user of the printer makes a flat-rate contract with a printer sales company. The printer sales company thereafter sends the user a cartridge to be used under the subscription scheme (hereinafter, referred to as a subscription cartridge).

Step (2) The user manually sets network connection of the printer to connect the printer to a management server.

Step (3) The user mounts the subscription cartridge to the printer. The printer thereafter notifies the management server that the subscription cartridge has been inserted.

Step (4) The management server receives the notification, which indicates that the subscription cartridge has been mounted, from the printer, and starts a billing service by notifying the printer of start of the billing service.

However, in order to use the subscription scheme for the printer, it is necessary to set the network connection for connecting to the management server provided by the printer sales company on the printer side. The setting by the user of the printer causes a problem of requiring user's time and effort.

DESCRIPTION

An object of the present disclosure is to enable easy use of a subscription scheme for a printer without requiring user's time and effort.

A first aspect of the present disclosure is an image forming apparatus including: a main body housing; a network interface configured to connect to a network; a cartridge mountable to the main body housing, and having a material or a component to be used for image formation in the image forming apparatus and a memory that stores contract information for permitting use of the cartridge in the image forming apparatus set to a contract mode; a communication unit configured to perform communication with using a mobile network different from the network; and a controller configured to: acquire the contract information from the memory, in a state where the cartridge is mounted to the main body housing; permit printing in the image forming apparatus using the cartridge, based on the contract information acquired from the memory; and transmit information about the image forming apparatus or the cartridge regarding the contract mode to a communication apparatus, which is set as a transmission destination in advance, via the communication unit.

According to the configuration of the first aspect, the controller performs processing for the subscription scheme in the image forming apparatus in the state where the cartridge is mounted to the main body housing. Therefore, a user of the image forming apparatus does not have to take a procedure for using the subscription scheme in the image forming apparatus. In this way, it is possible to use the subscription scheme in the image forming apparatus simply by mounting the cartridge to the main body housing of the image forming apparatus. Therefore, the user can easily use the subscription scheme in the image forming apparatus by the simple operation of mounting the cartridge to the main body housing of the image forming apparatus.

In the first aspect, the contract mode is a control mode that the controller operates in a state where a contract for a service is concluded for the image forming apparatus, and a normal mode is a control mode that the controller operates in a state where a contract for a service is not concluded for the image forming apparatus, the image forming apparatus enables to set the control mode to be switched between the contract mode and the normal mode, and in a state where the image forming apparatus is set to the contract mode, the controller is configured to: transmit the information about the image forming apparatus or the cartridge regarding the contract mode to the communication apparatus, in a case where the controller permits the printing in the image forming apparatus using the cartridge; and switch the control mode from the contract mode to the normal mode, in a case where the controller does not permit the printing in the image forming apparatus using the cartridge.

According to the above configuration, the control mode of either the contract mode or the normal mode is set simply by mounting the cartridge to the main body housing. Therefore, it is possible to execute both image formation in the contract mode and image formation in the normal mode in one image forming apparatus.

In the first aspect, the information transmitted to the communication apparatus includes the contract information, identification information that is unique to the cartridge, and consumption information indicating a level of consumption of the material or the component in the cartridge.

In the first aspect, the controller is configured to transmit the information to the communication apparatus with using the communication unit, without using the network interface. According to the above configuration, even an image forming apparatus without a network interface can use the contract mode.

In the first aspect, a band of the mobile network is narrower than a band of communication with using the network interface. The narrower the band is, the lower the communication speed is, but the cheaper the communication cost is. Therefore, it is possible to use the mobile network at low cost. That is, since a communication network having a narrow band can be used at low cost, it is easy to introduce a flat-rate service of a printer.

In the first aspect, the cartridge has the communication unit. Thereby, even an image forming apparatus without a network function for connecting to a server can use the flat-rate service.

In the first aspect, the main body housing has the communication unit. Thereby, it is not necessary to provide the cartridge with a communication unit, so that it is possible to reduce the production cost of the cartridge.

In the first aspect, at least the two cartridges are mountable to the main body housing, the at least two cartridges mounted to the main body housing are configured to transmit and receive information about the contract mode stored in the memory with respect to each other, and at least one cartridge of the at least two cartridges is provided with the communication unit. According to the above configuration, since it is not necessary for each of the plurality of cartridges to have a communication unit, it is possible to reduce the production cost of the cartridges when a plurality of cartridges are used.

A second aspect of the present disclosure is a control method of controlling an image forming apparatus, the control method including the steps of: acquiring contract information from a memory of a cartridge having a material or a component to be used for image formation in the image forming apparatus and the memory that stores contract information for permitting use of the cartridge in the image forming apparatus set to a contract mode, in a state where the cartridge is mounted to a main body housing of the image forming apparatus; permitting printing in the image forming apparatus using the cartridge, based on the contract information acquired from the memory; and transmitting information about the image forming apparatus or the cartridge regarding the contract mode to a communication apparatus, which is set as a transmission destination in advance, via a communication unit that is different from a network interface for which the image forming apparatus connects to a network, the communication unit performing communication with using a mobile network.

In the second aspect, the information is transmitted to the communication apparatus with using the communication unit, without using the network interface. According to the configuration of the second aspect, even an image forming apparatus without a network interface can use the contract mode.

A third aspect of the present disclosure is a cartridge including: a material or a component to be used for image formation in an image forming apparatus; a memory that stores contract information for permitting use of the cartridge in the image forming apparatus set to a contract mode; and a communication unit configured to perform communication with using a mobile network, in which printing in the image forming apparatus using the cartridge is permissible to be performed, based on the contract information stored in the memory, and the communication unit is configured to transmit information about the image forming apparatus or the cartridge regarding the contract mode to a communication apparatus which is set as a transmission destination in advance.

According to the configuration of the third aspect, even when the image forming apparatus does not have a network function for connecting to the server, it is possible to receive a flat-rate service simply by mounting the cartridge to the main body housing.

According to the above aspects of the present disclosure, it is possible to enable the user of the printer to easily use the subscription scheme for the printer without requiring user's time and effort.

First Embodiment

<Configuration of Image Forming Apparatus 1>

Figure 1:
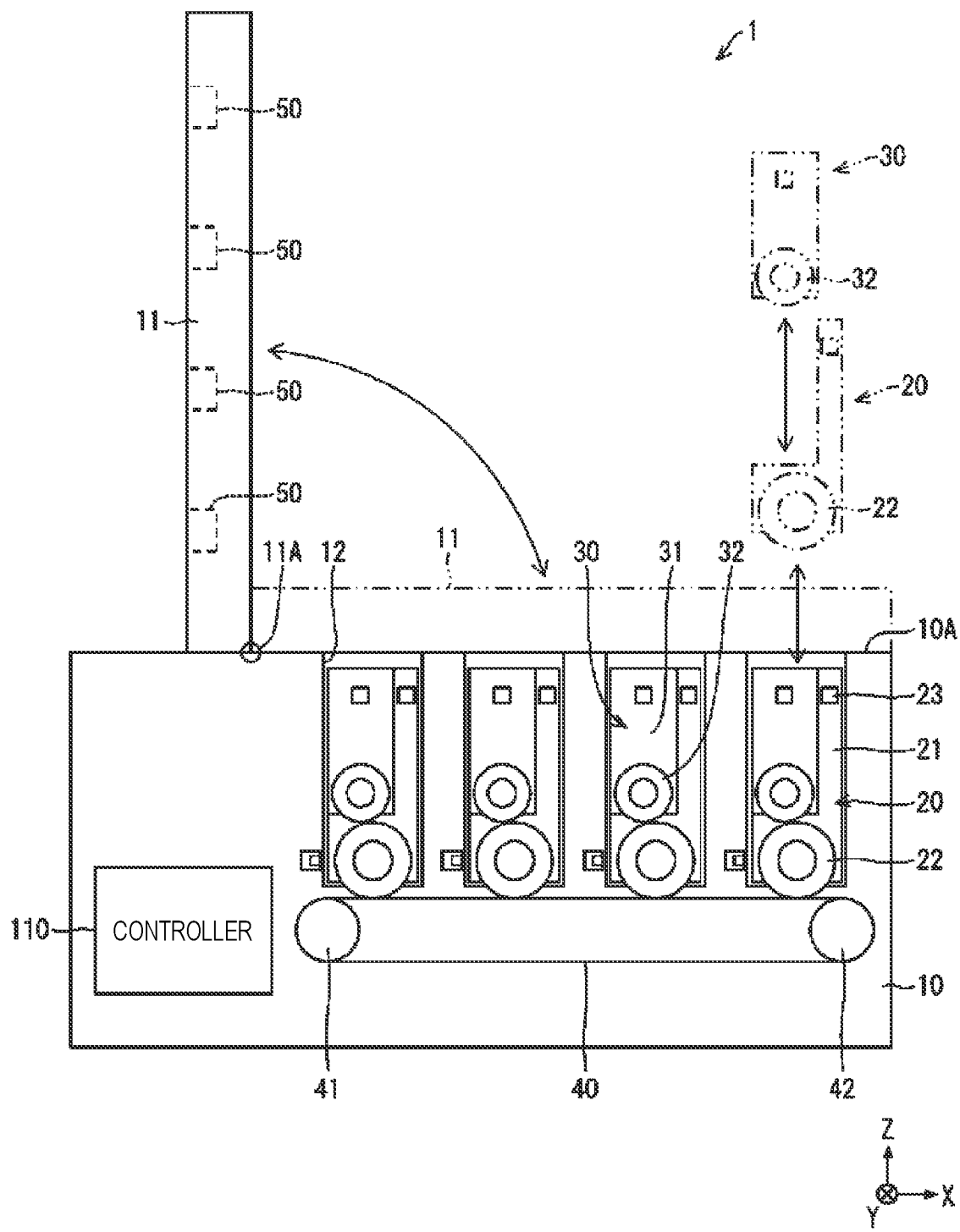
FIG. 1 is a schematic view showing a configuration of an image forming apparatus of the present disclosure.
Figure 2:
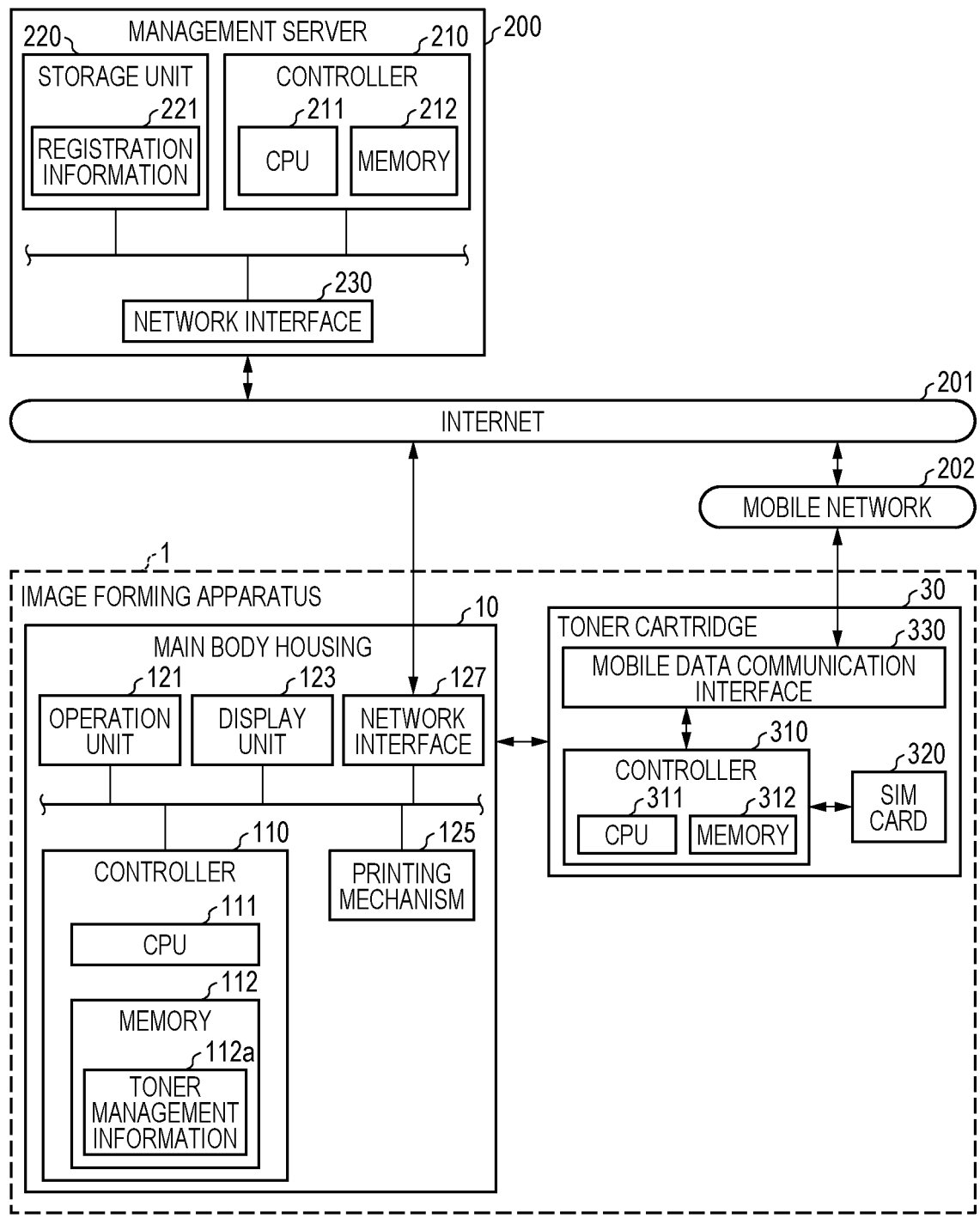
FIG. 2 is a schematic configuration block diagram for illustrating network connection between the image forming apparatus shown in FIG. 1 and a management server.

FIG. 1 is a schematic view showing a configuration of an image forming apparatus 1 of a first embodiment of the present disclosure. FIG. 2 is a schematic configuration block diagram for illustrating network connection between the image forming apparatus 1 shown in FIG. 1 and a management server (communication apparatus) 200. Note that, in FIG. 1, a direction in which drum cartridges 20 are aligned is referred to as the X direction, a direction directed from a transfer belt 40 toward a cover 11 with the cover 11 closed is referred to as the Z direction, and a direction orthogonal to both the X direction and the Z direction is referred to as the Y direction. In addition, although the image forming apparatus 1 shown in FIG. 1 has four toner cartridges 30, it is considered that all the toner cartridges have the same configuration, and only one toner cartridge 30 is shown in the image forming apparatus 1 shown in FIG. 2.

The image forming apparatus 1 is an electrophotographic type printer. An example of the image forming apparatus 1 may be an LED (Light Emitting Diode) printer. As shown in FIGS. 1 and 2, the image forming apparatus 1 includes a main body housing 10, a cover 11, drum cartridges 20, toner cartridges 30, a transfer belt 40, light source units 50, and a controller 110.

<Configuration of Main Body Housing 10>

The main body housing 10 is formed in a rectangular box shape. The main body housing 10 is configured to accommodate the four drum cartridges 20, the four toner cartridges 30, the transfer belt 40, and the controller 110. The main body housing 10 has four cartridge holding parts 12. Each cartridge holding part 12 has a concave shape. The drum cartridge 20 and the toner cartridge 30 are mounted to the main body housing 10 by being held by each of the cartridge holding parts 12.

A display unit 123 such as a liquid crystal display or a lamp and an operation unit 121 such as a button may be provided on an outer surface of the main body housing 10. The liquid crystal display may be configured to function as an input unit by having a touch panel.

In addition, the main body housing 10 has the controller 110, and the operation unit 121, the display unit 123, a printing mechanism 125 and a network interface 127, which are controlled by the controller 110.

The controller 110 has, for example, an ASIC (Application Specific Integrated Circuit). The controller 110 is configured to cause the image forming apparatus 1 to perform printing processing and processing associated therewith by executing various processing.

Specifically, the controller 110 has a CPU 111 for controlling the image forming apparatus 1 and a memory 112 that stores information for managing image formation in the image forming apparatus 1. As the information stored in the memory 112, there is a control program configured to implement a control method of the image forming apparatus 1. The CPU 111 may be configured to operate according to the control program stored in the memory 112, thereby causing the controller 110 to cause the image forming apparatus 1 to perform processing.

In addition, the controller 110 may include a computer-readable recording medium having the control program stored thereon. As the recording medium, a tape, a disc, a card, a semiconductor memory, a programmable logic circuit, or the like can be used, in addition to a "non-temporary tangible medium", for example, a ROM (Read Only Memory) or the like.

Further, a RAM (Random Access Memory) or the like to which the control program is developed may be used. The control program may be supplied to a computer included in the controller 110 via any transmission medium (communication network, broadcast wave, or the like) capable of transmitting the control program. Note that, one aspect of the present disclosure can also be implemented in a form of a data signal embedded in a carrier wave, in which the control program is implemented by electronic transmission.

The memory 112 is a memory capable of reading and writing information. The memory 112 is, for example, a flash ROM or an EEPROM (registered trademark, Electronically Erasable and Programmable Read Only Memory). The memory 112 is configured to store registration information and life-span information. The registration information includes a drum ID that is read from a drum memory 23 and a toner ID that is read from a memory 312 of the toner cartridge 30.

The life-span information includes drum life-span information and toner life-span information. The drum life-span information stored in the memory 112 is the same as the drum life-span information stored in the drum memory 23. The toner life-span information stored in the memory 112 is the same as the toner life-span information stored in the memory 312. In addition, the memory 112 may also store a printer ID (main body ID). The printer ID is identification information for identifying each image forming apparatus 1, and is, for example, a main body serial number.

As described above, in the memory 112, in addition to the control program, toner management information 112a for managing toner of the toner cartridge 30 such as toner life-span information is stored as information for managing image formation. The toner management information 112a may also be information about the toner cartridge 30 stored in the memory 312 of the toner cartridge 30, which will be described later.

This can be implemented by the controller 110 of the main body housing 10 reading the information stored in the memory 312 of the toner cartridge 30 and storing the information in the memory 112 when the toner cartridge 30 is mounted to the main body housing 10. That is, when the toner cartridge 30 is mounted to the main body housing 10, the memory 312 is electrically connected to the controller 110. This make it possible for the controller 110 to execute processing of reading information from the memory 312 and processing of writing information to the memory 312.

The printing mechanism 125 includes the four drum cartridges 20, the four toner cartridges 30, the transfer belt 40, and the like, which are used when printing an image-formed medium. These members are driven and controlled by the controller 110.

The network interface 127 is connected to the management server 200 via the Internet 201. The controller 110 is configured to control the network interface 127 to perform communication with the Internet 201. Thereby, the toner management information 112a stored in the memory 112 of the controller 110 can be transmitted to the management server 200 via the Internet 201 by the network interface 127.

<Configuration of Cover 11>

The cover 11 is configured to open and close an opening 10A formed at an upper end of the main body housing 10. The cover 11 can rotate about a rotation shaft 11A extending in the Y direction between an open position shown by the solid line in FIG. 1 at which the opening 10A is opened and a closed position shown by the dashed-two dotted line in FIG. 1 at which the opening 10A is closed.

When the cover 11 is placed at the open position, each opening of the cartridge holding parts 12 is opened. When the cover 11 is placed at the closed position, each opening of the cartridge holding parts 12 is covered by the cover 11. The main body housing 10 is provided with a closing sensor (not shown) in the opening 10A. The closing sensor is a sensor configured to detect that the cover 11 is at the closed position. The closing sensor may be, for example, a contact type sensor or an optical type sensor.

<Configuration of Drum Cartridge 20>

The drum cartridge 20 is an example of the cartridge and is mountable to the main body housing 10. The drum cartridge 20 includes a cartridge housing 21, a photosensitive drum 22, and a drum memory 23. The cartridge housing 21 has the photosensitive drum 22 and the drum memory 23.

The photosensitive drum 22 is a component that is used for performing image formation, and is a replacement component that needs to be replaced because deterioration such as surface wear occurs with use. The photosensitive drum 22 is a cylindrical photosensitive member extending in the Y direction, and can rotate about a drum axis extending in the Y direction. An outer peripheral surface of the photosensitive drum 22 is covered with a photosensitive material.

The drum memory 23 is an example of the cartridge memory, and is a memory capable of reading and writing information. The drum memory 23 is, for example, a flash ROM (Read Only Memory) or an EEPROM. The drum memory 23 is configured to store, for example, a drum ID, drum life-span information, and drum identification information, as information about the photosensitive drum 22.

The drum ID is a unique main body serial number for identifying each drum cartridge 20. The drum life-span information is, for example, at least one of a cumulative number of rotations of the photosensitive drum 22 and a cumulative number of prints using the photosensitive drum 22. The cumulative number of rotations of the photosensitive drum 22 and the cumulative number of prints using the photosensitive drum 22 are respectively incremented or decremented and calculated each time printing is performed, in the drum cartridge 20 specified by the drum ID.

The drum identification information is an example of the identification information. The drum identification information is information indicating whether the drum cartridge 20 is a contract product or a normal product. The contract product can be used in a contract state where a service contract is concluded for the image forming apparatus 1, and cannot be used in a normal state where the service contract is not concluded for the image forming apparatus 1. The normal product is one that the image forming apparatus 1 can use in both the contract state and the normal state.

The service is such that a user can use the contract product. For example, in the service, a maximum number of prints is different according to a certain charging amount for the user every month, and the image forming apparatus 1 can perform printing by using the toner cartridge 30 of the contract product or the drum cartridge 20 of the contract product, which will be described later. Further, in the service, the drum cartridge 20 and the toner cartridge 30 are automatically delivered to a user's home, based on the life-span information stored in the memory 112 in the main body housing 10. This is a so-called subscription scheme service.

The drum memory 23 may also store following other information, in addition to the drum ID, the drum life-span information, and the drum identification information. The other information includes compatible models of the drum cartridge 20, a specification of the drum cartridge 20, information indicating whether the drum cartridge 20 is an unused product, information indicating whether the drum cartridge 20 is a genuine product, and information such as an error history of the cartridge 20. These information may also be similarly stored in the memory 312 of the toner cartridge 30.

<Configuration of Toner Cartridge 30>

The toner cartridge 30 is an example of the cartridge and is mountable to the main body housing 10. The toner cartridge 30 is integrated with the drum cartridge 20 by being mounted to the drum cartridge 20. The toner cartridge 30 has a cartridge housing 31 and a developing roller 32. The cartridge housing 31 is provided with the developing roller 32. The cartridge housing 31 is configured to accommodate toner.

The four cartridge housings 31 are configured to accommodate toners of different colors, as materials that are used for performing image formation. For example, the four cartridge housings 31 accommodate toners of respective colors of cyan, magenta, yellow, and black, respectively. Toner of one color is accommodated in one cartridge housing 31. Toner is a consumable that disappears with use.

The developing roller 32 is a cylindrical member extending in the Y direction, and can rotate about a developing axis extending in the Y direction. When the toner cartridge 30 is mounted to the drum cartridge 20, an outer peripheral surface of the developing roller 32 comes into contact with the outer peripheral surface of the photosensitive drum 22.

In addition, as shown in FIG. 2, the toner cartridge 30 has a controller 310, a SIM card (Subscriber Identity Module Card) 320, and a mobile data communication interface 330.

The controller 310 is a semiconductor chip having a CPU 311 for controlling toner consumption in the toner cartridge 30 and a memory 312 that stores information about the toner cartridge 30.

The memory 312 is an example of the cartridge memory, and is a memory capable of reading and writing information. The memory 312 is, for example, a flash ROM or an EEPROM. The memory 312 is configured to store, for example, a toner ID, toner life-span information, and toner identification information, as the information about the toner cartridge 30.

The toner ID is a unique main body serial number for identifying each toner cartridge 30. The toner life-span information is, for example, at least one of a cumulative number of rotations of the developing roller 32, a cumulative number of prints using the developing roller 32, and a cumulative number of dots using the developing roller 32.

The cumulative number of rotations of the developing roller 32 is incremented or decremented and calculated each time printing is performed, in one toner cartridge 30 specified by the toner ID. The cumulative number of prints using the developing roller 32 and the cumulative number of dots using the developing roller 32 are also calculated in a similar manner to the cumulative number of rotations of the developing roller 32.

The toner identification information is an example of the identification information. The toner identification information is information indicating whether the toner cartridge 30 is a contract product or a normal product. The meanings of the contract product and the normal product for the toner cartridge 30 are similar to the meanings of the contract product and the normal product for the drum cartridge 20. That is, the toner identification information includes contract information for permitting use of the toner cartridge 30 in the image forming apparatus 1 set in a contract mode (which will be described later). The contract information includes information about registration of a service and information about cancellation of the service.

The SIM card 320 is a card in which a unique ID (identification) number for identifying a telephone number is recorded so as to communicate with using the mobile network (mobile network) 202. The ID number recorded in the SIM card 320 is read and temporarily stored in the memory 312 by the controller 310. Here, since information that is transmitted by the mobile network 202 is the toner ID, the toner life-span information and the toner identification information (including the contract information), an amount of data is very small. Therefore, the information can be sufficiently transmitted to the management server 200 even in a communication network having a slow communication speed, i.e., a narrow band. Therefore, the band of the mobile network 202 is preferably narrower than the band of communication in the network interface 127. In this way, a communication network having a narrow band can be used at low cost, so that a flat-rate service of a printer can be easily introduced.

In addition, the mobile network 202 may be a public line that performs communication via a plurality of base stations, such as a cellular communication network. Note that, as described above, since the amount of data of the information that is transmitted by the mobile network 202 is small, a 2G (2nd generation communication method) line, a 3G (3rd generation communication method) line, and the like, each of which has a narrow band, are preferably used as the mobile network 202. Note that, the mobile network 202 is not particularly limited, but may be any communication network as long as it is a communication network excluding WiFi (registered trademark) and short-range communication.

The mobile data communication interface 330 is connected to the management server 200 via the mobile network 202 and the Internet 201. The controller 310 is configured to control the mobile data communication interface 330 to perform communication with the mobile network 202 with using the ID number recorded in the SIM card 320 stored in the memory 312. That is, since the toner cartridge 30 has the SIM card 320, the toner cartridge can communicate with the mobile network 202. Moreover, a communication apparatus (management server 200), which is a communication destination (information transmission destination), is preferably set in advance in the SIM card 320. Thereby, a transmission protocol is set in the mobile data communication interface 330 so that information can be transmitted to the management server 200, which is the transmission destination set in the SIM card 320. Therefore, since the toner cartridge 30 has the SIM card 320, the toner cartridge 30 is connected to the management server 200 without user's consciousness.

Thereby, the information about the toner cartridge 30 stored in the memory 312 of the toner cartridge 30 can be transmitted to the management server 200 via the mobile network 202 and the Internet 201 by the mobile data communication interface 330 without user's consciousness.

Since the toner cartridge 30 is in a state of being electrically connected to the controller 110 of the main body housing 10 when mounted to the main body housing 10, the controller 110 and the controller 310 can communicate with each other. Thereby, the information about the toner cartridge 30 stored in the memory 312 of the toner cartridge 30 is transmitted to the controller 110 and is stored as the toner management information 112a in the memory 112 of the main body housing 10.

<Configuration of Transfer Belt 40>

The transfer belt 40 is a component configured to transfer a developer (for example, toner) on the surface of the photosensitive drum to a print sheet. The transfer belt 40 is a replacement component that needs to be replaced because deterioration such as surface wear occurs with use. The transfer belt 40 is an annular belt that can come into contact with the photosensitive drum 22. The outer peripheral surface of the photosensitive drum 22 can come into contact with an outer peripheral surface of the transfer belt 40. During printing processing, a print sheet is conveyed between the transfer belt 40 and the photosensitive drum 22.

The transfer belt 40 is extended between a drive roller 41 and a driven roller 42. The drive roller 41 is configured to drive the transfer belt 40. The controller 110 is configured to rotate the drive roller 41. The driven roller 42 is configured to rotate according to movement of the transfer belt 40 accompanying drive of the drive roller 41.

<Configuration of Light Source Unit 50>

The four light source units 50 are attached to an inner surface of the cover 11, and correspond to the drum cartridges 20 and the toner cartridges 30, respectively. The light source unit 50 is arranged to face the surface of the photosensitive drum 22 in a state in which the drum cartridge 20 is mounted to the main body housing 10 and the cover 11 is at the closed position. In addition, each of the four light source units 50 has a plurality of light sources aligned in the Y direction. The light source can irradiate the outer peripheral surface of the photosensitive drum 22 with light. The source is, for example, an LED.

The light source unit 50 is electrically connected to the controller 110. The controller 110 is configured to cause the plurality of light sources of the light source unit 50 to emit light, according to input image data. Thereby, the light sources irradiate the outer peripheral surface of the photosensitive drum 22 with light. As a result, the photosensitive material on the outer peripheral surface of the photosensitive drum 22 is exposed, according to the image data.

The image forming apparatus 1 shown in FIG. 1 is configured to switch a control mode, which is executed by the controller 110, between a contract mode, which is a control mode that is executed in a contract state in which a contract for a flat-rate service (subscription scheme) is concluded, and a normal mode, which is a control mode that is executed in a state in which the contract is not concluded. In order to execute the contract mode, the image forming apparatus 1 needs to be connected to the management server 200 (FIG. 2) via a network.

<Configuration of Management Server 200>

The management server 200 is a communication apparatus set as a transmission destination in advance so as to perform communication by the mobile data communication interface 330 of the toner cartridge 30. As shown in FIG. 2, the management server 200 includes a controller 210, a storage unit 220, and a network interface 230.

The controller 210 has a CPU 211 for managing and controlling a terminal apparatus (for example, the image forming apparatus 1) that is managed by the management server 200, and a memory 212 for storing information (control program, and the like) regarding management control.

The storage unit 220 is a memory capable of reading and writing information. The storage unit 220 is configured to store registration information 221 necessary for performing management control in the controller 210. The registration information 221 includes information about a user who uses the image forming apparatus 1 that is managed by the management server 200. The information about the user is information in which information for specifying the user is associated with the image forming apparatus 1 that the user uses. The information about the user also includes contract information indicating that a contract for a flat-rate service has been concluded for the image forming apparatus 1. The registration information 221 is used by the controller 210, as needed.

The network interface 230 is connected to the image forming apparatus 1 via the Internet 201. The controller 210 is configured to control the network interface 230 to perform communication with the Internet 201. Thereby, the controller 210 can receive information such as toner management information 112a from the image forming apparatus 1 via the Internet 201.

Therefore, in the image forming apparatus 1, when the toner cartridge 30 is mounted to the main body housing 10, the controller 110 executes acquisition processing of acquiring the contract information from the memory 312, permission processing of permitting printing in the image forming apparatus 1 using the toner cartridge 30, based on the contract information acquired from the memory 312 by the acquisition processing, and transmission processing of transmitting, to the management server 200 that is a communication apparatus set as a transmission destination in advance, the information about the image forming apparatus 1 or the toner cartridge 30 regarding the contract mode with using the mobile data communication interface 330, which is the communication unit.

The image forming apparatus 1 of the present embodiment enables the use of a flat-rate service (subscription scheme) with using the fact that the controller 110 executes the acquisition processing, the permission processing, and the transmission processing, as described above. A flow of processing relating to the use of the subscription scheme will be described below.

<Use Start of Subscription Scheme>

Figure 3:
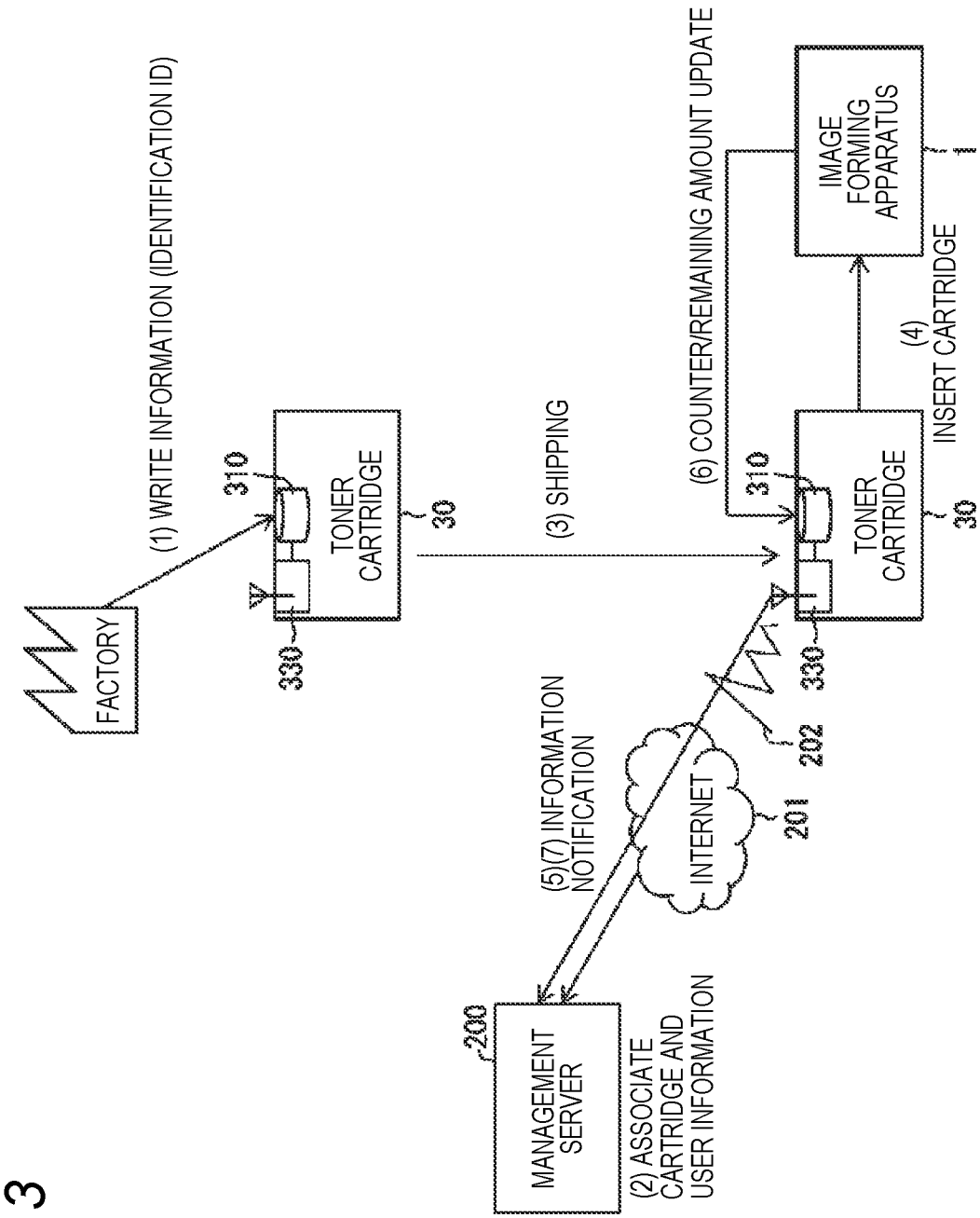
FIG. 3 is a view illustrating an example in which a communication module is mounted on a cartridge side.
Figure 4:
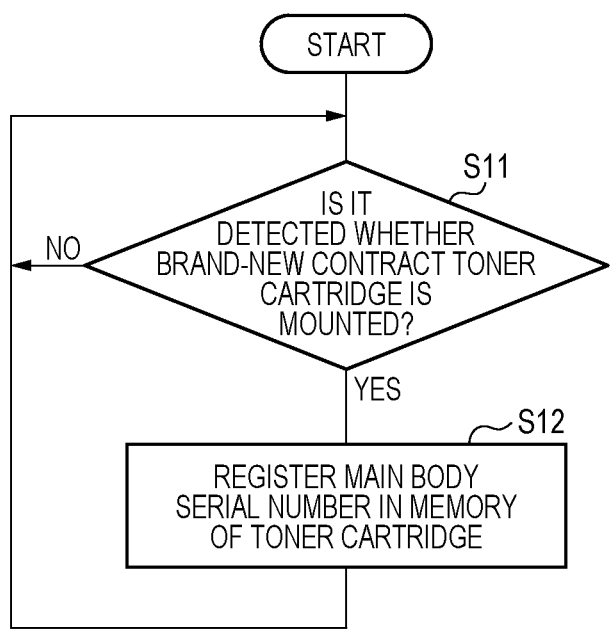
FIG. 4 is a flowchart showing a flow of processing of registering main body information in a memory of a brand-new contract cartridge.

FIG. 3 is a view schematically showing a flow of use of a subscription scheme using the image forming apparatus 1 shown in FIG. 1. FIG. 4 is a flowchart showing a flow of processing of registering main body information in the controller 310 mounted on the toner cartridge 30.

First, as shown in (1) of FIG. 3, information is written to the controller 310 of the toner cartridge 30 at the factory. That is, at the factory, identification ID is written to the memory 312 of the toner cartridge 30. The identification ID is the same as the toner ID described above, and is a unique main body serial number for identifying each toner cartridge 30.

On the other hand, as shown in (2) of FIG. 3, the management server 200 associates the cartridge with the user information. That is, the management server 200 associates the toner cartridge 30 with the user information of the user who uses the image forming apparatus 1. Here, the identification ID of the toner cartridge 30 and a user name for identifying the user are associated with each other.

After that, as shown in (3) of FIG. 3, the toner cartridge 30 is shipped to the user. In the toner cartridge 30 shipped at this time, the identification ID is just written in the memory 312.

Subsequently, as shown in (4) of FIG. 3, the toner cartridge 30 is inserted into the image forming apparatus 1. At this time, the toner cartridge 30 is mounted to the internal main body housing 10 by being inserted into the image forming apparatus 1. The toner cartridge 30 is mounted to the main body housing 10 in this way, so that the memory 312 of the toner cartridge 30 and the controller 110 of the main body housing 10 are electrically connected to each other. That is, in a state in which the toner cartridge 30 is mounted to the main body housing 10, the controller 110 of the main body housing 10 can write information or read information with respect to the memory 312 of the toner cartridge 30.

Here, as shown in FIG. 4, the controller 110 determines whether it has been detected that the brand-new contract toner cartridge 30 is mounted to the main body housing 10 of the image forming apparatus 1 (step S11). When the mounting is detected, the controller 110 registers the main body serial number of the image forming apparatus 1 in the memory 312 of the toner cartridge 30 (step S12). The method itself for detecting that the toner cartridge 30 is mounted to the main body housing 10 is not particularly limited. For example, the cartridge holding part 12 may be provided with a sensor for detecting the mounting of the toner cartridge 30. When the sensor for detecting the mounting of the toner cartridge 30 is provided, the controller 110 may receive a detection result of the sensor and detect that the toner cartridge 30 is mounted to the main body housing 10, from the detection result. In addition, it may be detected that the toner cartridge 30 is mounted to the main body housing 10, based on the fact that the controller 110 is electrically connected to the memory 312 or the drum memory 23. Here, the main body serial number is the identification information stored in the memory 112 of the controller 110 of the image forming apparatus 1.

Figure 5:
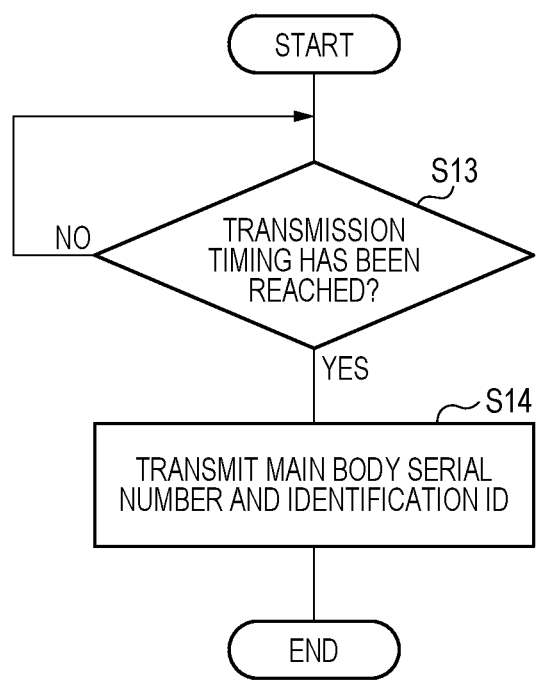
FIG. 5 is a flowchart showing a flow of processing of transmitting information necessary for a contract stored in the memory of the cartridge to the management server.

As shown in FIG. 4, after the main body serial number is registered in the memory 312 of the brand-new contract toner cartridge 30, the controller 310 of the toner cartridge 30 notifies information from the mobile data communication interface 330 of the toner cartridge 30 to the management server 200 via the mobile network 202 and the Internet 201, as shown in (5) of FIG. 3. Specifically, as shown in FIG. 5, the controller 310 of the toner cartridge 30 determines whether it has been detected that a transmission timing has been reached (step S13). When the reach to the transmission timing is detected, the controller 310 of the toner cartridge 30 transmits the main body serial number and the identification ID stored in the memory 312 of the toner cartridge 30 to the management server 200 at a predetermined timing without using the network interface 127 of the image forming apparatus 1. Here, the transmission timing in step S13 may be at least after the registration of the main body serial number in the memory 312 of the toner cartridge 30 is completed, such as a time point when the controller 310 of the toner cartridge 30 detects that the main body serial number has been registered in the memory 312, or a time point when a predetermined time has elapsed since the detection.

After that, in the management server 200, since the identification ID of the toner cartridge 30 and the user information are associated with each other in advance, it is possible to determine whether the toner cartridge 30 is a legitimate toner cartridge 30 mounted to the image forming apparatus 1 having a contract for a flat-rate service, from the main body serial number and the identification ID transmitted from the toner cartridge 30.

That is, when it is determined in the management server 200 that the toner cartridge 30 is a legitimate toner cartridge 30 that can be used by the image forming apparatus 1 having a contract for a flat-rate service, the service can be received, as it is.

In this way, the user can easily use the flat-rate service, i.e., the subscription scheme simply by mounting the toner cartridge 30 to the main body housing 10 of the image forming apparatus 1. That is, the user does not have to perform network setting when using the subscription scheme.

<Detection of Unauthorized Use of Subscription Scheme>

Figure 6:
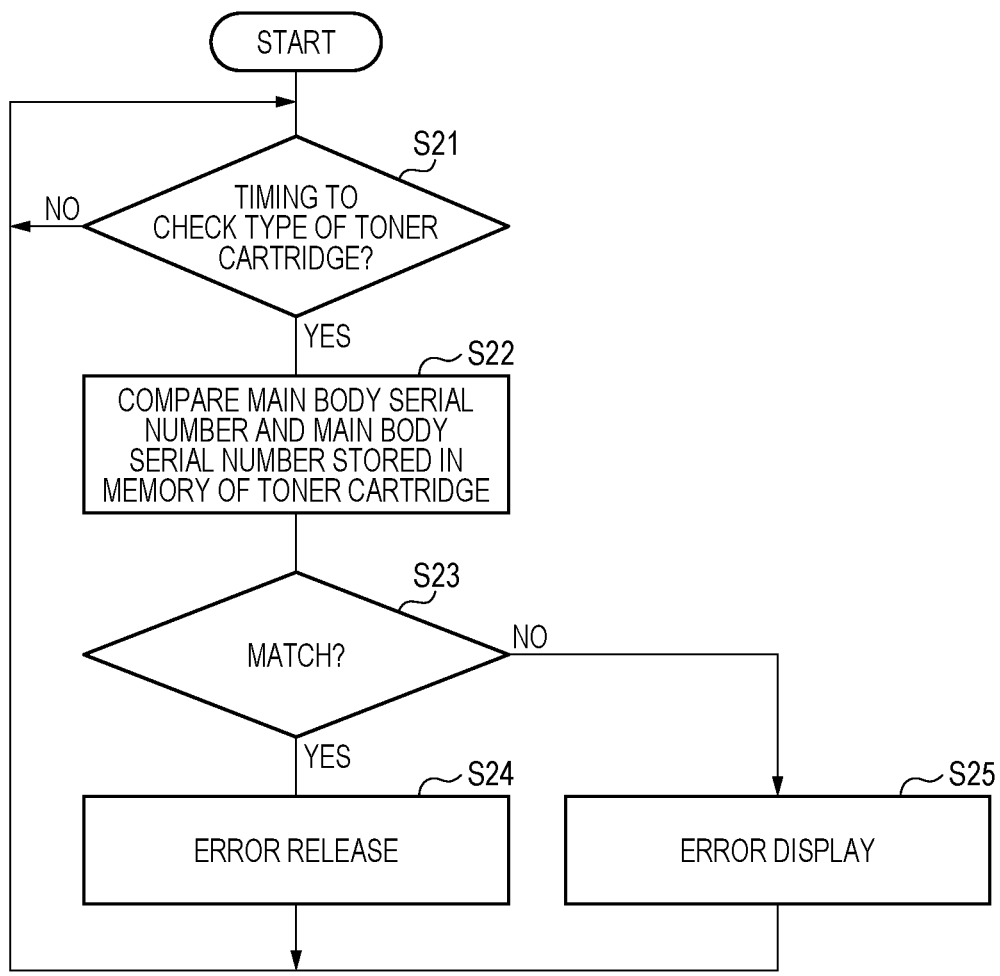
FIG. 6 is a flowchart showing a flow of processing for detecting unauthorized use of the cartridge.

FIG. 6 is a flowchart showing a flow of processing for detecting unauthorized use of the toner cartridge 30. In addition to the legitimate toner cartridge 30 registered for use in the subscription scheme, the same model of the toner cartridge 30 not registered for use in the subscription scheme can also be mounted to the image forming apparatus 1. Therefore, it is necessary to periodically determine whether the toner cartridge 30 is a legitimate toner cartridge 30, i.e., whether there is any unauthorized use.

For example, in the image forming apparatus 1, the controller 110 determines whether it is a timing to check the type of the toner cartridge (step S21). The timing here is when a power supply of the image forming apparatus 1 is turned on. Note that, the timing may also be when the cover 11 is opened or when the cover 11 is closed, not when the power supply is turned on. Therefore, when the controller 110 determines that the power supply of the image forming apparatus 1 is turned on, i.e., determines in step S21 that the timing has been reached (YES), the controller 110 compares the main body serial number and the main body serial number stored in the memory 312 (step S22). Here, the type check of the toner cartridge is to check whether the cartridge is a subscription cartridge that can use the subscription scheme. In addition, the main body serial number is the identification information of the image forming apparatus 1, and the main body serial number stored in the memory 312 is the identification number of the image forming apparatus 1 stored in the memory 312 at the time when the toner cartridge 30 has been mounted to the main body housing 10 of the image forming apparatus 1.

Note that, when the controller 110 starts the processing of step S21, the controller 110 puts the image forming apparatus 1 into a state in which image formation cannot be temporarily performed, i.e., an Error state.

Next, the controller 110 determines whether the main body serial number and the main body serial number stored in the memory 312 match each other (step S23). Here, when the controller 110 determines that the main body serial number and the main body serial number stored in the memory 312 match each other (S23: YES), the controller 110 releases the Error (step S24). That is, the image forming apparatus 1 is released from the state in which image formation cannot be temporarily performed, and can perform image formation.

On the other hand, when the controller 110 does not determine in step S23 that the main body serial number and the main body serial number stored in the memory 312 match each other (NO), the controller 110 performs an Error display (step S25). That is, the controller 110 maintains the image forming apparatus 1 in the Error state in which image formation cannot be temporarily performed. Here, the controller 110 causes the display unit 123 provided to the main body housing 10 to display an Error.

As described above, the processing shown in FIG. 6 is processing in which the controller 110 performs permission processing of permitting printing in the image forming apparatus 1 using the toner cartridge 30, based on the contract information acquired from the memory 312. In short, the processing is processing for using the image forming apparatus 1 in the contract mode.

In addition, when the Error state in which image formation cannot be temporarily performed is maintained for the image forming apparatus 1, the user may operate the operation unit 121 of the main body housing 10 to switch from the contract mode to the normal mode, thereby returning to the state in which image formation can be performed.

That is, in a state in which the image forming apparatus 1 is set to the contract mode, when the controller 110 permits the use in the image forming apparatus using the toner cartridge 30 in the permission processing, in the case of YES in step S23 of FIG. 6, the controller 110 performs Error release in step S24, and transmits the information about the image forming apparatus 1 or the toner cartridge 30 regarding the contract mode to the management server 200. On the other hand, in the permission processing, when the use in the image forming apparatus using the toner cartridge 30 is not permitted, in the case of NO in step S23 of FIG. 6, the Error display is performed in step S25 and the contract mode is switched to the normal mode.

In a state in which the image forming apparatus 1 is set to the normal mode, when the use in the image forming apparatus 1 using the toner cartridge 30 is permitted in the permission processing, the information about the image forming apparatus 1 or the toner cartridge 30 regarding the contract mode is transmitted to the management server 200. On the other hand, in the permission processing, when the use in the image forming apparatus using the toner cartridge 30 is not permitted, the information about the image forming apparatus 1 or the toner cartridge 30 regarding the contract mode is not transmitted to the management server 200.

<Update of Toner Use Status in Subscription Scheme>

Figure 7:
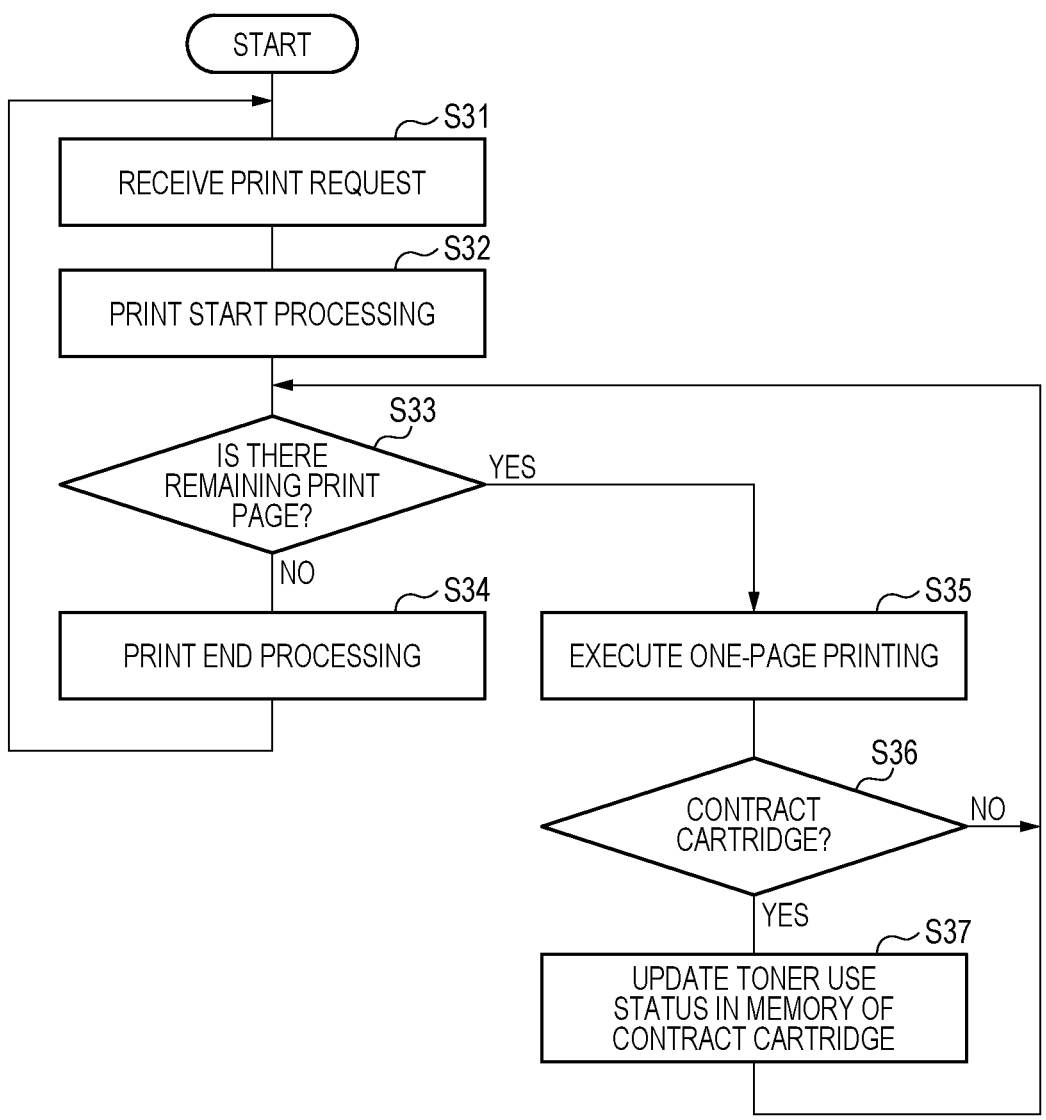
FIG. 7 is a flowchart showing a flow of processing of updating a use status of toner at the time of printing.

FIG. 7 is a flowchart showing a flow of processing of updating a use status of toner at the time of printing in the image forming apparatus 1. In the description below, the toner cartridge 30 registered for use in the subscription scheme will be referred to as a contract cartridge.

First, the controller 110 receives a print request (step 31). Specifically, the controller 110 receives a print request via the operation unit 121. Next, the controller 110 performs print start processing (step S32). Specifically, the controller 110 controls the printing mechanism 125 to start printing, according to the received print request. Here, the print request indicates image data to be printed, a total number of prints, and the like.

Subsequently, the controller 110 determines whether there is a remaining print page during printing (step S33). Here, when the controller 110 determines that there is a remaining print page (S33: YES), the controller 110 further executes one-page printing (step S35). On the other hand, when the controller 110 determines that there is no remaining print page (S33: NO), the controller 110 performs print end processing (step S34). Performing the print end processing means performing processing such as returning the printing mechanism 125 to a standby state.

In step S35, after the controller 110 executes one-page printing, the controller 110 determines whether the cartridge mounted to the main body housing 10 is a contract cartridge (step S36). Here, when the controller 110 determines that the contract cartridge is mounted to the main body housing 10 (S36: YES), the controller 110 updates a toner use status (life-span information) in the memory 312 (step S37). The controller 110 updates the life-span information in the memory 112 when there is an image forming operation (update processing). The controller 110 updates the life-span information in the memory 112 by the update processing, and then stores the updated information in the memory 312 of the toner cartridge 30. Thereby, the life-span information in the memory 112 of the controller 110 updated according to the image forming operation is also updated in the memory 312 of the cartridge 30. Thereby, the life-span information in both the memories can be appropriately matched. The processing of matching the life-span information in both the memories corresponds to counter/remaining amount update processing shown in (6) of FIG. 3. On the other hand, when the controller 110 determines in step S36 that the cartridge mounted to the main body housing 10 is not a contract cartridge (NO), the controller 110 proceeds to step S33 and continues printing.

<Transmission of Toner Use Status in Subscription Scheme>

Figure 8:
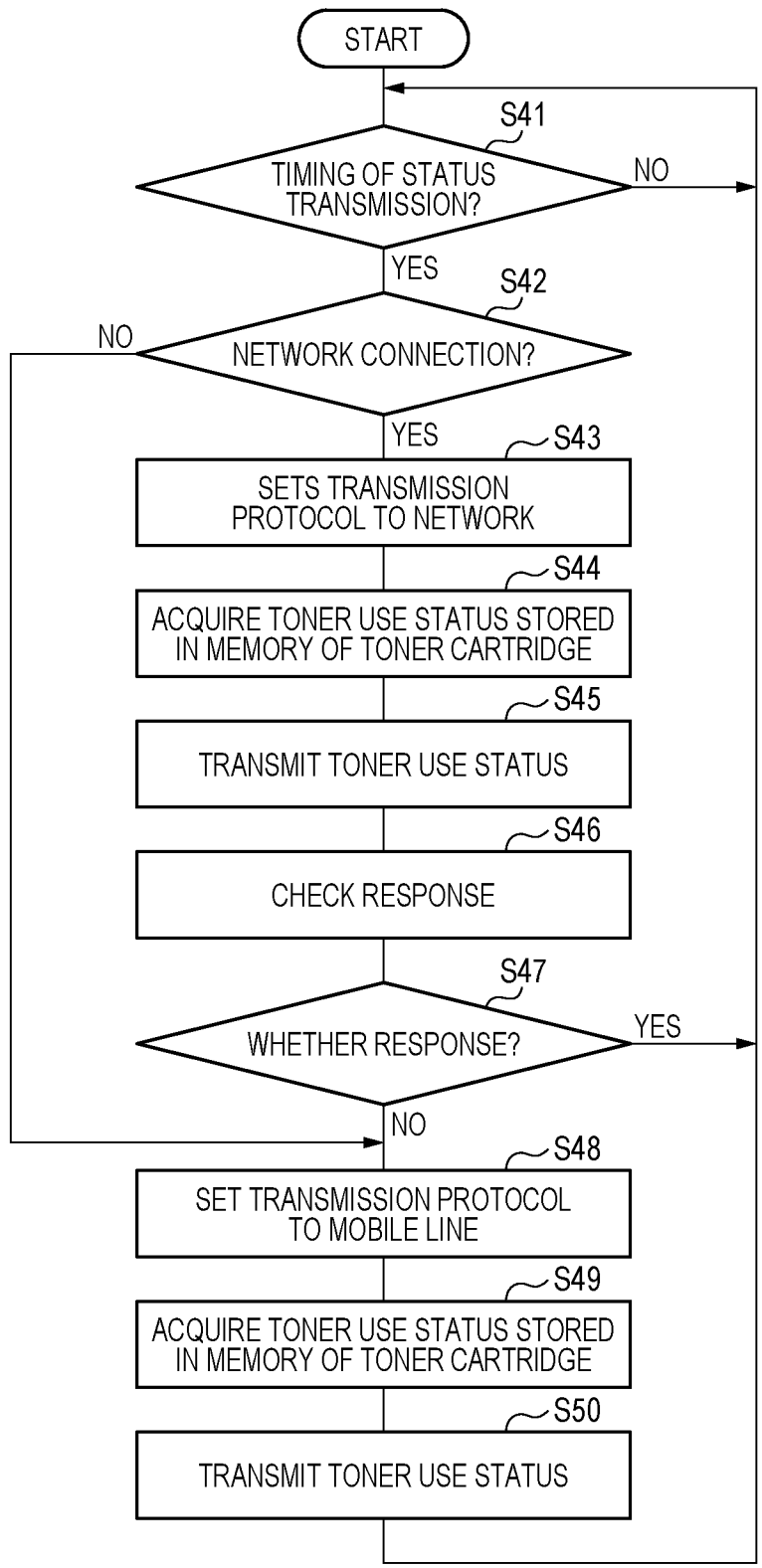
FIG. 8 is a flowchart showing a flow of processing of transmitting the use status of toner to the management server.

FIG. 8 is a flowchart showing a flow of processing of transmitting the use status of toner to the management server 200. The transmission processing of the use status of toner corresponds to information notification shown in (7) of FIG. 3.

First, the controller 110 determines whether it is a timing of status transmission (step S41). Here, the status transmission is to transmit the toner use status of the toner cartridge 30 to the management server 200. The timing of status transmission is a preset timing such as a certain time interval (for example, every one hour or the like) or a certain printing interval (every 100 page count after a print end engine is stopped, or the like). Therefore, when the controller 110 determines in step S41 that it is the transmission timing (YES), the controller 110 determines whether there is a network connection (step S42). Here, the determination as to whether there is a network connection is made based on whether the controller 110 connects to the Internet 201 by the network interface 127.

When the controller 110 determines in step S42 that there is a network connection (YES), the controller 110 sets the transmission protocol to the network (step S43). The controller 110 sets the transmission protocol for the network interface 127 so as to connect to the management server 200 via the Internet 201.

On the other hand, when the controller 110 determines in step S42 that there is no network connection (NO), the controller 110 sets the transmission protocol to a mobile line (step S48). The mobile line is the mobile network 202. The controller 110 sets the transmission protocol for the mobile data communication interface 330 of the toner cartridge 30 so as to connect to the management server 200 via the mobile network 202 and Internet 201.

After setting the transmission protocol to the network in step S43, the controller 110 acquires the toner use status stored in the memory 312 of the toner cartridge 30 (step S44). Here, the controller 110 stores the acquired toner use status in the memory 112.

Next, the controller 110 transmits the acquired toner use status to the management server 200 (step S45). Here, the information that is transmitted as the toner use status is the toner ID for identifying the toner cartridge 30, the main body serial number of the image forming apparatus 1, a telephone number registered by the user, and information indicating a remaining amount of consumable. In step S45, the controller 110 transmits the toner use status stored in the memory 112 to the management server 200 via the Internet 201 by the network interface 127.

The controller 110 checks a response, after transmitting the toner use status (step S46). Then, the controller 110 determines whether there is a response (step S47). Here, the determination as to whether there is a response is made based on whether the controller 110 receives a signal from the management server 200 within a predetermined time after, for example, transmitting the toner use status. That is, the controller 110 determines that there is a response when a signal from the management server 200 is received within a predetermined time after transmitting the toner use status, and determines that there is no response when a signal from the management server 200 cannot be received within the predetermined time after transmitting the toner use status.

Therefore, when the controller 110 determines in step S47 that there is a response (YES), the controller 110 determines that the toner use status has been successfully transmitted to the management server 200, proceeds to step S41 again, and checks the timing of status transmission.

On the other hand, when the controller 110 determines in step S47 that there is no response (NO), the controller 110 proceeds to step S48 and sets the transmission protocol to the mobile line, as in the case where the controller 110 determines in step S42 that there is no network connection (NO). That is, the controller 110 switches from the network interface 127 of the main body housing 10 to the mobile data communication interface 330 of the toner cartridge 30 to transmit the toner use status.

After the controller 110 sets the transmission protocol to the mobile line in step S48, the controller 310 of the toner cartridge 30 acquires the toner use status stored in the memory 312 (step S49). Here, unlike the case where there is a network connection, the controller 310 acquires the toner use status stored in the memory 312 of the controller 310 of the toner cartridge 30, and temporarily stores the same in the memory in the CPU 311.

Then, the controller 310 transmits the acquired toner use status to the management server 200 (step S50). Here, the information that is transmitted as the toner use status is the toner ID for identifying the toner cartridge 30, the main body serial number of the image forming apparatus 1, the telephone number set in the SIM card 320, and the information indicating a remaining amount of consumable. Here, the controller 310 transmits the toner use status stored in the memory in the CPU 311 to the management server 200 via the mobile network 202 and the Internet 201 by the mobile data communication interface 330. In addition, after the controller 310 transmits the toner use status, the controller 110 again checks the timing of status transmission (step S41).

As described above, the image forming apparatus 1 can transmit the toner use status with using two types of interfaces, the network interface 127 on the main body housing 10 side and the mobile data communication interface 330 on the toner cartridge 30 side. The image forming apparatus 1 is designed to preferentially use the network interface 127 on the main body housing 10 side, but the present disclosure is not limited thereto.

For example, even when the main body housing 10 side is not provided with the network interface 127, if the toner cartridge 30 side is provided with the mobile data communication interface 330, the toner use status can be transmitted to the management server 200. That is, even when the image forming apparatus 1 does not have the network connection function, the toner use status can be transmitted to the management server 200 with using the mobile data communication interface 330.

As described above, in the image forming apparatus 1, the information that is transmitted to the management server 200 is the toner ID that is the identification information unique to the toner cartridge 30, and the consumption information indicating a level of consumption of the material or component in the toner cartridge 30, in addition to the contract information.

Since the toner cartridge 30 side is provided with the mobile data communication interface 330, which is a communication unit for connecting to the management server 200 via the mobile network 202, the contract information, the toner ID and the consumption information, which are to be transmitted to the management server 200, are preferably stored in the memory 312. Note that, the contract information, the toner ID, and the consumption information may also be stored in the memory 112 on the main body housing 10 side. In this case, when the toner cartridge 30 is mounted to the main body housing 10 and connected to the management server 200, the toner cartridge 30 may be configured to read the contract information, the toner ID, and the consumption information from the memory 112. The information reading timing may be when the toner cartridge 30 is mounted to the main body housing 10 and the controller 310 of the toner cartridge 30 and the controller 110 of the main body housing 10 are electrically connected to each other or may be when the controller 310 and the controller 110 are electrically connected to each other and the power supply of the image forming apparatus 1 is thus turned on, and is not particularly limited.

When the contract information, the toner ID, and the consumption information are stored in the memory 112 of the main body housing 10, the main body housing 10 side of the image forming apparatus 1 is provided with the mobile data communication interface 330, which is a communication unit, for connecting to the management server 200 via the mobile network 202.

An example in which the main body housing 10 side of the image forming apparatus 1 is provided with the mobile data communication interface 330 is shown below.

Figure 9:
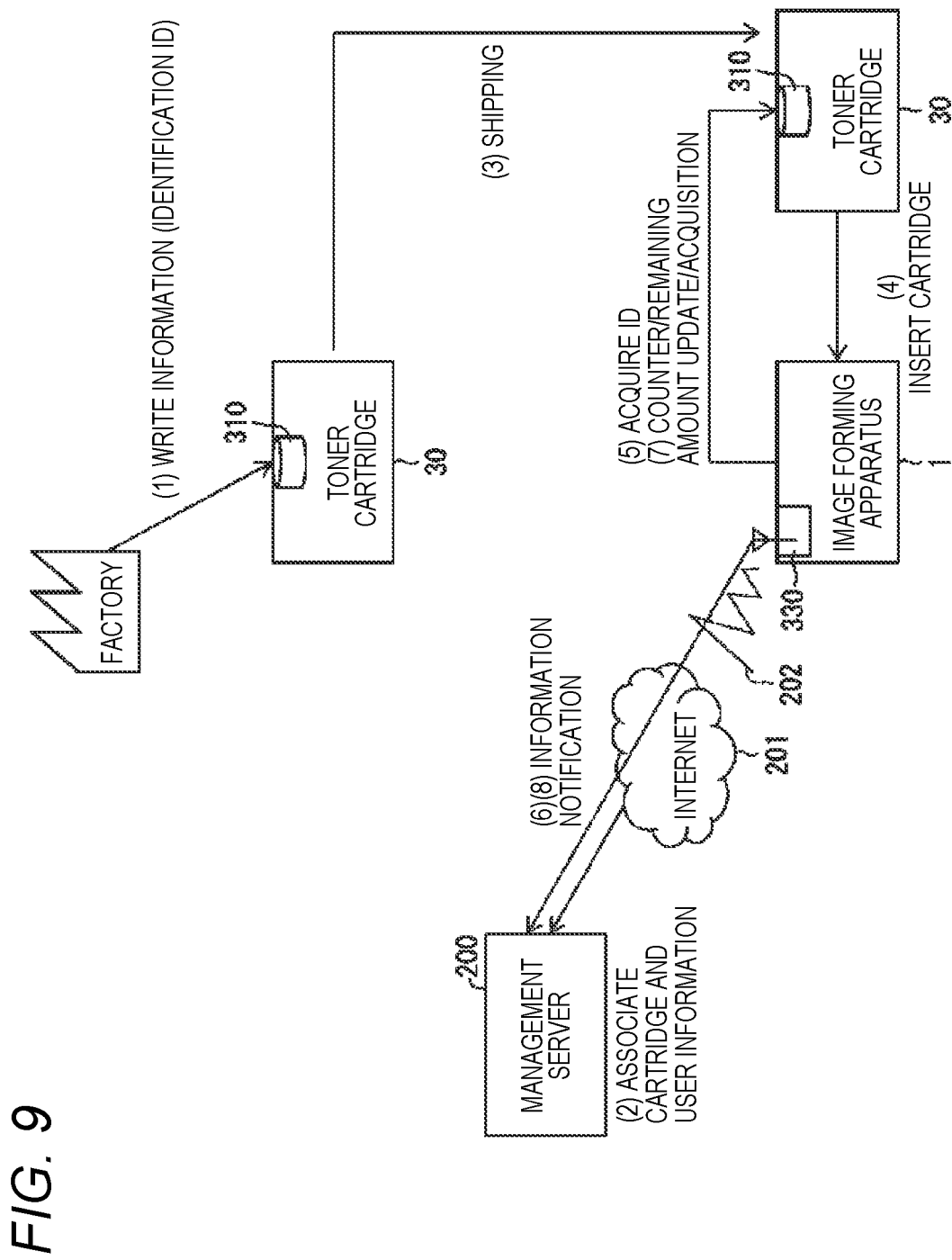
FIG. 9 is a view illustrating an example in which the image forming apparatus side is provided with a communication module.

FIG. 9 is a view illustrating an example in which the image forming apparatus 1 side is provided with the mobile data communication interface 330.

FIG. 9 is almost the same as the illustrative view shown in FIG. 3, except that the mobile data communication interface 330 is provided to the image forming apparatus 1, not the toner cartridge 30, and processing ((5) in FIG. 9) in which the toner cartridge 30 acquires an ID of the image forming apparatus 1 after the toner cartridge 30 is inserted in the image forming apparatus 1 is added. That is, the processing (1) to (3) in FIG. 9 is the same as the processing (1) to (3) in FIG. 3.

As shown in (4) of FIG. 9, the toner cartridge 30 is inserted into the image forming apparatus 1. At this time, the toner cartridge 30 is mounted to the main body housing 10 by being inserted into the image forming apparatus 1. In this way, in the state in which the toner cartridge 30 is mounted to the main body housing 10 (the controller 310 and the controller 110 are electrically connected to each other), as shown in (5) of FIG. 9, the toner cartridge 30 acquires the main body ID of the image forming apparatus 1 by the controller 310.

The processing shown in (6) and (8) of FIG. 9 corresponds to the processing shown in (5) and (7) of FIG. 3, respectively, and each processing is almost the same processing, except that the information notification to the management server 200 is performed with the mobile data communication interface 330 provided on the image forming apparatus 1 side. Note that, as shown in (7) of FIG. 9, the toner cartridge 30 acquires information indicating a state in which the counter/remaining amount has been updated in the image forming apparatus 1.

Second Embodiment

Another embodiment of the present disclosure will be described below. Note that, for convenience of description, the members having the same functions as the members described in the first embodiment are denoted with the same reference signs, and the descriptions thereof are not repeated.

Figure 10:
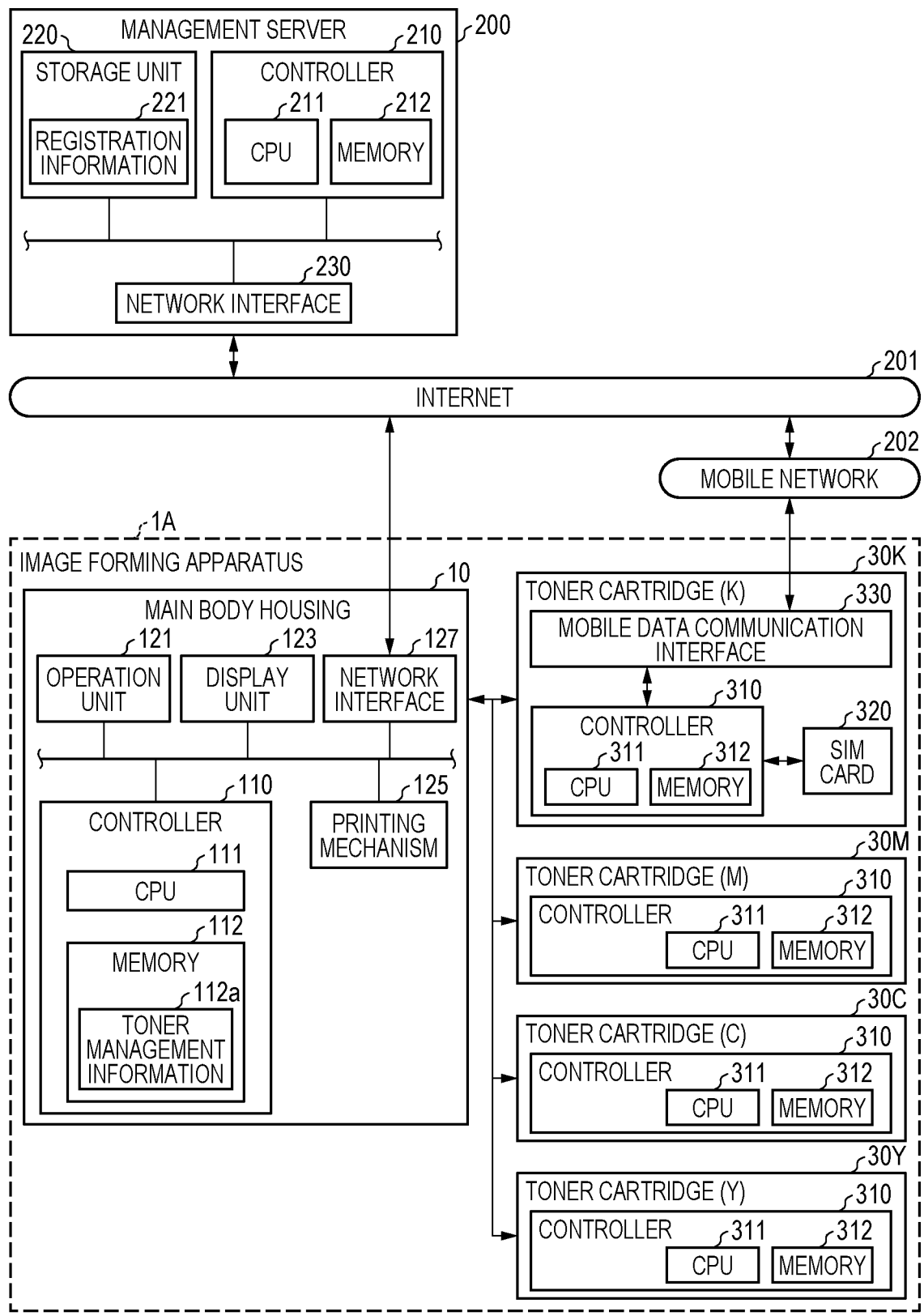
FIG. 10 is a schematic configuration block diagram for illustrating network connection between an image forming apparatus having four types of toner cartridges and the management server.

FIG. 10 is a schematic configuration block diagram for illustrating network connection between an image forming apparatus 1A having four types of toner cartridges and the management server 200. As shown in FIG. 10, the image forming apparatus 1A has substantially the same configuration as the image forming apparatus 1 of the first embodiment, but the configuration of the toner cartridge 30 is different. The image forming apparatus 1A includes a toner cartridge 30K, a toner cartridge 30M, a toner cartridge 30C, and a toner cartridge 30Y for accommodating toners of respective colors of black (K), magenta (M), cyan (C), and yellow (Y). Of the four types of toner cartridges, only the toner cartridge 30K has the same configuration as the toner cartridge 30 of the first embodiment, and includes the SIM card 320 and the mobile data communication interface 330, but the toner cartridge 30M, the toner cartridge 30C and the toner cartridge 30Y do not include the SIM card 320 and the mobile data communication interface 330.

In addition, the information stored in the respective memories 312 of the toner cartridge 30M, the toner cartridge 30C, and the toner cartridge 30Y is collected in the toner cartridge 30K and transmitted to the management server 200 via the mobile network 202 and the Internet 201 by the mobile data communication interface 330. Note that, the information that is transmitted to the management server 200 is the same as the information that is transmitted to the management server 200 by the toner cartridge 30 of the first embodiment, and is therefore omitted here.

In the image forming apparatus 1A, the example in which the four toner cartridges are provided has been shown. However, the present disclosure is not limited thereto, and the above technology can be applied as long as at least two toner cartridges are provided. That is, at least two toner cartridges may be configured to be able to transmit and receive information about the contract mode stored in the memory 312 with respect to each other, and at least one of the at least two cartridges may be provided with the mobile data communication interface 330.

[Supplementary Matters]

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

Although the image forming apparatus 1 described above is an electrophotographic printer, the image forming apparatus may also be an inkjet printer. In the case of an inkjet printer, an ink cartridge configured to supply ink may be used as a cartridge. In addition, a tape cassette configured to supply a tape as a printing base material may be used as a cartridge. Further, the present disclosure is not limited to the form described above where the drum cartridge 20 has the photosensitive drum 22 and the toner cartridge 30 has the developing roller 32. Some specific examples of potential alternatives, modifications, or variations in the described invention are provided below.

First Modified Embodiment

For example, as a first modified embodiment, the drum cartridge 20 may have the developing roller 32, in addition to the cartridge housing 21, the photosensitive drum 22 and the drum memory 23. In this case, the cartridge housing 21 is provided with the photosensitive drum 22, the drum memory 23 and the developing roller 32. Further, in the first modified embodiment, the toner cartridge 30 has the cartridge housing 31 and a toner memory, but does not have the developing roller 32. The cartridge housing 31 is configured to accommodate toner. The outer peripheral surface of the developing roller 32 is in contact with the outer peripheral surface of the photosensitive drum 22 inside the drum cartridge 20.

Second Modified Embodiment

In addition, as a second modified embodiment, the image forming apparatus 1 may further include a developing cartridge (not shown) having the developing roller 32. In this case, the drum cartridge 20 includes the cartridge housing 21, the photosensitive drum 22, and the drum memory 23. The toner cartridge 30 has the cartridge housing 31 and the toner memory, but does not have the developing roller 32. The cartridge housing 31 is configured to accommodate toner. In the second modified embodiment, the cartridge holding part 12 holds the three components, the drum cartridge 20, the toner cartridge 30 and the developing cartridge, so that the three components are mounted to the main body housing 10.

Third Modified Embodiment

Further, as a third modified embodiment, the image forming apparatus 1 may include one cartridge (not shown), instead of the drum cartridge 20 and the toner cartridge 30. In this case, the one cartridge has a cartridge housing, the photosensitive drum 22, a memory, and the developing roller 32. The outer peripheral surface of the developing roller 32 is in contact with the outer peripheral surface of the photosensitive drum 22 inside the one cartridge. The cartridge housing of the one cartridge is configured to accommodate toner.

Note that, in each of the above embodiments, the example of the toner cartridge 30 has been described as the cartridge. However, the present disclosure is not limited thereto, and can also be similarly applied to, for example, the drum cartridge 20 in which the toner cartridge 30 is loaded.

Fourth Modified Embodiment

Specifically, the drum cartridge 20 has the drum memory 23, as shown in FIG. 1. In the drum memory 23, the drum ID, which is identification information, and the drum life-span information, which is life-span information, are stored. When the drum cartridge 20 is mounted to the main body housing 10, the drum memory 23 is electrically connected to the controller 110. This make it possible for the controller 110 to execute processing of reading information from the drum memory 23 and processing of writing information to the drum memory 23.

Therefore, the controller 110 acquires the drum ID and the drum life-span information from the drum memory 23 of the drum cartridge 20, and transmits the acquired information to the management server 200 by the network interface 127 or the mobile data communication interface 330.

In this way, by transmitting the information acquired from the drum memory 23 to the management server 200, the controller 110 can perform the same processing as the processing using the toner cartridge 30 by replacing the toner cartridge 30 with the drum cartridge 20 in the processing shown in FIGS. 4, 5, 6, 7 and 8.

The present invention is not limited to each of the embodiments described above and can be diversely changed within the scope defined in the claims, and embodiments implemented by appropriately combining the technical means disclosed in each of the different embodiments are also included in the technical scope of the present invention.

What is claimed is:

1. An image forming apparatus comprising:
   a main body housing;
   a network interface configured to connect to a network;
   a cartridge mountable to the main body housing, and having a material or a component to be used for image formation in the image forming apparatus and a memory that stores contract information for permitting use of the cartridge in the image forming apparatus set to a contract mode;
   a communication unit configured to perform communication with using a mobile network different from the network, the communication unit being separate from the network interface; and
   a controller configured to:
      acquire the contract information from the memory, in a state where the cartridge is mounted to the main body housing;
      permit printing in the image forming apparatus using the cartridge, based on the contract information acquired from the memory; and
      transmit information about the image forming apparatus or the cartridge regarding the contract mode to a communication apparatus, which is set as a transmission destination in advance, via the communication unit.

2. The image forming apparatus according to claim 1, wherein the contract mode is a control mode that the controller operates in a state where a contract for a service is concluded for the image forming apparatus, and a normal mode is a control mode that the controller operates in a state where a contract for a service is not concluded for the image forming apparatus,
   the image forming apparatus enables to set the control mode to be switched between the contract mode and the normal mode, and
   in a state where the image forming apparatus is set to the contract mode, the controller is configured to:
      transmit the information about the image forming apparatus or the cartridge regarding the contract mode to the communication apparatus, in a case where the controller permits the printing in the image forming apparatus using the cartridge; and
      switch the control mode from the contract mode to the normal mode, in a case where the controller does not permit the printing in the image forming apparatus using the cartridge.

3. The image forming apparatus according to claim 1, wherein the information transmitted to the communication apparatus includes the contract information, identification information that is unique to the cartridge, and consumption information indicating a level of consumption of the material or the component in the cartridge.

4. The image forming apparatus according to claim 1, wherein the controller is configured to transmit the information to the communication apparatus with using the communication unit, without using the network interface.

5. The image forming apparatus according to claim 1, wherein a band of the mobile network is narrower than a band of communication with using the network interface.

6. The image forming apparatus according to claim 1, wherein the cartridge comprises the communication unit.

7. The image forming apparatus according to claim 1, wherein the main body housing comprises the communication unit.

8. The image forming apparatus according to claim 1, wherein at least the two cartridges are mountable to the main body housing,
   the at least two cartridges mounted to the main body housing are configured to transmit and receive information about the contract mode stored in the memory with respect to each other, and
   at least one cartridge of the at least two cartridges is provided with the communication unit.

9. A control method of controlling an image forming apparatus, the control method comprising the steps of:
   acquiring contract information from a memory of a cartridge having a material or a component to be used for image formation in the image forming apparatus and the memory that stores contract information for permitting use of the cartridge in the image forming apparatus set to a contract mode, in a state where the cartridge is mounted to a main body housing of the image forming apparatus;

permitting printing in the image forming apparatus using the cartridge, based on the contract information acquired from the memory; and transmitting information about the image forming apparatus or the cartridge regarding the contract mode to a communication apparatus, which is set as a transmission destination in advance, via a communication unit that is different from a network interface for which the image forming apparatus connects to a network, the communication unit performing communication with using a mobile network, the communication unit being separate from the network interface.

10. The control method according to claim 9, wherein the information is transmitted to the communication apparatus with using the communication unit, without using the network interface.

11. A cartridge comprising:

a material or a component to be used for image formation in an image forming apparatus;

a memory that stores contract information for permitting use of the cartridge in the image forming apparatus set to a contract mode; and a communication unit configured to perform communication with using a mobile network, wherein printing in the image forming apparatus using the cartridge is permissible to be performed, based on the contract information stored in the memory, and the communication unit is configured to transmit information about the image forming apparatus or the cartridge regarding the contract mode to a communication apparatus which is set as a transmission destination in advance.

* * * * *